United States Patent
Chen et al.

(10) Patent No.: US 8,738,547 B2
(45) Date of Patent: May 27, 2014

(54) SYSTEM AND METHODS FOR FINDING HIDDEN TOPICS OF DOCUMENTS AND PREFERENCE RANKING DOCUMENTS

(75) Inventors: Xi Chen, Pittsburgh, IL (US); Yanjun Qi, Princeton, NJ (US); Bing Bai, North Brunswick, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 314 days.

(21) Appl. No.: 13/083,391

(22) Filed: Apr. 8, 2011

(65) Prior Publication Data
US 2012/0191632 A1    Jul. 26, 2012

Related U.S. Application Data (60) Provisional application No. 61/360,599, filed on Jul. 1, 2010, provisional application No. 61/381,310, filed on Sep. 9, 2010.

(51) Int. Cl.
*G06N 99/00* (2010.01)

(52) U.S. Cl.
CPC .................... *G06N 99/005* (2013.01)
USPC .......................................................... 706/12

(58) Field of Classification Search
CPC ................................................... G06N 99/005
USPC ........................................................... 706/12
See application file for complete search history.

(56) References Cited

PUBLICATIONS

Bai et al ("Polynomial Semantic Indexing" Dec. 7, 2009).*
Langford et al ("Sparse Online Learning via Truncated Gradient" Jul. 2008).*
Kakade et al ("Learning Exponential Families in High-Dimensions: Strong Convexity and Sparsity" Oct. 2009.*
Hu et al ("Accelerated Gradient Methods for Stochastic Optimization and Online Learning" NIPS 2009).*
Sun et al ("Robust Sparse Rank Learning for Non-Smooth Ranking Measures" Jul. 2009).*
Aslam et al ("Document Selection Methodologies for Efficient and Effective Learning-to-Rank" Jul. 2009.*
X. Chen, Y. Qi, B. Bai, Q. Lin, J.G. Carbonell (2011) "Sparse Latent Semantic Analysis", SIAM 2011 International Conference on Data Mining (SDM2011).

(Continued)

*Primary Examiner* — Lut Wong
(74) *Attorney, Agent, or Firm* — Joseph Kolodka; Akitaka Kimura (57) ABSTRACT

Systems and methods are disclosed to perform preference learning on a set of documents includes receiving raw input features from the set of documents stored on a data storage device; generating polynomial combinations from the raw input features; generating one or more parameters; applying the parameters to one or more classifiers to generate outputs; determining a loss function and parameter gradients and updating parameters determining one or more sparse regularizing terms and updating the parameters; and expressing that one document is preferred over another in a search query and retrieving one or more documents responsive to the search query.

19 Claims, 3 Drawing Sheets

(56) References Cited

PUBLICATIONS

X. Chen, B. Bai, Y. Qi, Q. Lin, J. Carbonell, (2010) "Learning Preferences using Millions of Features by Enforcing Sparsity" IEEE ICDM 2010.

D. Blei, A. Ng, and M. Jordan. Latent dirichlet allocation. Journal of Machine Learning Research, 3:993-1022, 2003.

S. Garimella, S. Nemala, M. Elhilali, T.Tran, and H. Hermansky. Sparse coding for speech recognition. In IEEE International Confernece on Acoustics, Speech and Signal Processing, 2010.

H. Zou, T. Hastie, and R. Tibshirani. Sparse principal component analysis. Journal of Computational and Graphical Statistics, 15, 2004.

R. Zass and A. Shashua. Nonnegative sparse pca. In Advances in Neural Information Processing Systems (NIPS), 2007.

B. Bai, J.Weston. D. Grangier, R. Collobert, K. Sadamasa, Y. Qi, O. Chapelle, Kilian Weinberger, (2009), "Learning to Rank with (a Lot of) Word Features", the special issue on Learning to Rank of the Information Retrieval Journal.

David Grangier and Samy Bengio. A discriminative kernel-based approach to rank images from text queries. IEEE Trans. PAMI., 30(8):1371-1384, 2008.

Qinfeng Shi, James Petterson, Gideon Dror, John Langford, Alex Smola, Alex Strehl, and Vishy Vishwanathan. Hash kernels. In Twelfth International Conference on Artificial Intelligence and Statistics, 2009.

\* cited by examiner

SYSTEM AND METHODS FOR FINDING HIDDEN TOPICS OF DOCUMENTS AND PREFERENCE RANKING DOCUMENTS

This application claims priority to Provisional Application Ser. Nos. 61/360,599 filed Jul. 1, 2010 and 61/381,310 filed Sep. 9, 2010, the contents of which are incorporated by reference.

BACKGROUND

The present application relates to systems and methods for classifying documents. Learning preferences among a set of objects (e.g. documents) given another object as query is a central task of information retrieval and text mining. One of the most natural frameworks for this task is the pairwise preference learning, expressing that one document is preferred over another given the query. Most existing methods learn the preference or relevance function by assigning a real valued score to a feature vector describing a (query, object) pair. This feature vector normally includes a small number of hand-crafted features, such as the BM25 scores for the title or the whole text, instead of the very natural raw features. A drawback of using hand-crafted features is that they are often expensive and specific to datasets, requiring domain knowledge in preprocessing. In contrast, the raw features are easily available, and carry strong semantic information (such as word features in text mining).

Polynomial models (using combination of features as new features) on raw features are powerful and are easy to acquire in many preference learning problems. However, there are usually a very large number of features, make storing and learning difficult. For example, a basic model which uses the raw word features under the supervised pairwise preference learning framework and consider feature relationships in the model. In this model, D be the dictionary size, i.e. the size of the query and document feature set, given a query $q \in R^D$ and a document $d \in R^D$, the relevance score between q and d is modeled as:

$$f(q, d) = q^T W d = \sum_{i,j} W_{ij} \Phi(q_i, d_j), \quad (1)$$

where $\Phi(q_i, d_j) = q_i \cdot d_j$ and $W_{ij}$ models the relationship/correlation between $i^{th}$ query feature $q_i$ and $j^{th}$ document feature $d_j$. This is essentially a linear model with pairwise features $\Phi(\cdot, \cdot)$ and the parameter matrix $W \in R^{D \times D}$ is learned from labeled data. Compared to most of the existing models, the capacity of this model is very large because of the $D^2$ free parameters which can carefully model the relationship between each pair of words. From a semantic point of view, a notable superiority of this model is that it can capture synonymy and polysemy as it looks at all possible cross terms, and can be tuned directly for the task of interest.

Although it is very powerful, the basic model in Eq. (1) suffers from the following weakness which hinders its wide application:

1. Memory requirement: Given a dictionary size D, the model requires a large amount of memory to store the W matrix with a size quadratic in D. When D=10,000, storing W needs nearly 1 Gb of RAM (assuming double); when D=30,000, W storage requires 8 Gb of RAM.
2. Generalization ability: Given $D^2$ free parameters (entries of W), when the number of training samples is limited, it can easily lead to overfitting. Considering the dictionary with the size D=10,000, then $D^2=10^8$ free parameters that need to be estimated which is far too many for small corpora.

Recently researchers found out that raw features (e.g. words for text retrieval) and their pairwise features which describe relationships between two raw features (e.g. word synonymy or polysemy) could greatly improve the retrieval precision. However, most existing methods can not scale up to problems with many raw features (e.g. English vocabulary), due to the prohibitive computational cost on learning and the memory requirement to store a quadratic number of parameters.

Since such models are not practical, present systems often create a smaller feature space by dimension reduction technologies such as PCA. When raw features are used, polynomial models are avoided. When the polynomial models are used, various approaches can be used, including:

1. Sparse model: remove the parameters that are less important. However, empirical studies on very large sparse models are lacking
2. Low rank approximation: try to decompose the relationship matrix.
3. Hashing: try to put the big number of parameters into a smaller number of bins.

In a related trend, unsupervised dimension reduction methods, like Latent Semantic Analysis (LSA) have been widely used in the field of text mining for hidden topic detection. The key idea of LSA is to learn a projection matrix that maps the high dimensional vector space representations of documents to a lower dimensional latent space, i.e. so called latent topic space. However LSA could not provide a clear and compact topic-word relationship due LSA projects each topic as a weighted combination of all words in the vocabulary.

Two existing models are closely related to LSA and have been used to find compact topic-word relationships from text data. Latent Dirichlet Allocation (LDA) provides a generative probabilistic model from Bayesian perspective to search for topics. LDA can provide the distribution of words given a topic and hence rank the words for a topic. However LDA could only handle a small number of hidden topics. Sparse coding, as another unsupervised learning algorithm, learn basis functions which capture higher-level features in the data and has been successfully applied in image processing and speech recognition. Sparse coding could provide a compact representation between the document to topics, but could not provide a compact represent between topic to words, since topics are learned basis functions associated to all words.

SUMMARY

In one aspect, a method to perform preference learning on a set of documents includes receiving raw input features from the set of documents stored on a data storage device; generating polynomial combinations from the raw input features; generating one or more parameters W; applying W to one or more classifiers to generate outputs; determining a loss function and parameter gradients and updating W; determining one or more sparse regularizing terms and updating W; and expressing that one document is preferred over another in a search query and retrieving one or more documents responsive to the search query.

In another aspect, a method to apply a query to a set of documents includes reconstructing a document term matrix $X \in R^{N \times M}$ by minimizing reconstruction errors with min $\|X - UA\|$, wherein A is a fixed projection matrix and U is a column orthogonal matrix; determining a loss function and parameter gradients to generate U; fixing U while determining the loss function and sparse regularization constraints on the projection matrix A; generating parameter coefficients and generating a sparse projection matrix A; and generating a Sparse Latent Semantic Analysis (Sparse SLA) model and applying the model to a set of documents and displaying documents matching a query.

Advantages of the preferred embodiments may include one or more of the following. Sparsity is applied to the model which is achieved by an $l_1$ regularization with an efficient online learning method. The method achieves good performance with fast convergence, while remaining sparse during training (small memory consumption), on a model with hundreds of millions of parameters. Extended models can learn group structure or even hierarchical structure of the words using group lasso type of regularization. The prior knowledge on the structure of W can also be imposed. In short, the system is highly efficient, fast and requires minimal computational resources.

DESCRIPTION

1) Learning Preferences Upon Millions of Features Over Sparsity

Figure 1:
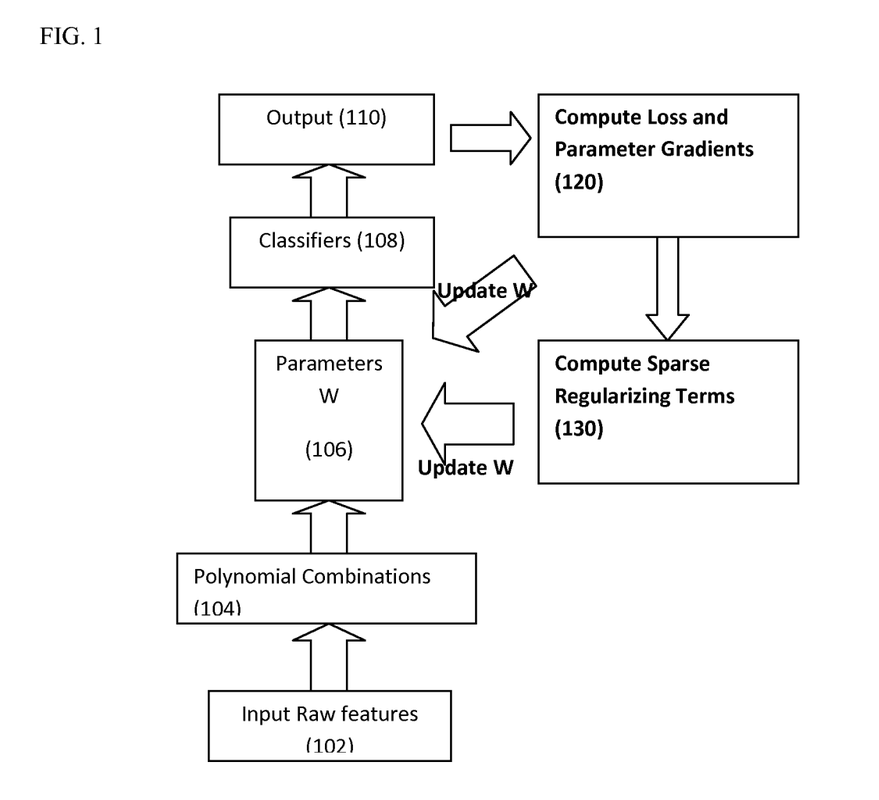
FIG. 1 shows an exemplary process for generating preference learning models.

FIG. 1 shows an exemplary process for generating preference learning models. This method, also known as Learning Preferences upon Millions of Features Over Sparsity, can quickly generate preference models that require a small amount memory and achieve good accuracy. Turning now to FIG. 1, raw input features are received by the process (102). Next, polynomial combinations are generated (104). Parameters W, as detailed below, are derived (106), and applied to one or more classifiers (108) which generate outputs (110). The process then determines loss and parameter gradients (120). The process then updates W parameters used in 106. Next, the process determines sparse regularizing terms (130), and then updates W parameters used in 106.

The system of FIG. 1 constrains W to be a sparse matrix with many zero entries for the pairs of words which are irrelevant for the preference learning task. If W is a highly sparse matrix, then it consumes much less memory and has only a limited number of free parameters to be estimated. In other words, a sparse W matrix will allow the process to greatly scale up the dictionary size to model infrequent words which are often essential for the preference ordering. In addition, a faster and more scalable learning process is achieved since most entries of W are zeros so that those multiplications can be avoided. Another advantage of learning a sparse representation of W is its good interpretability. The zero $W_{ij}$ indicate that $i^{th}$ query feature and $j^{th}$ document feature are not correlated to the specific task. A sparse W matrix will accurately capture correlation information between pairs of words and the learned correlated word pairs could explain the semantic rationale behind the preference ordering.

In order to enforce the sparsity on W, the process imposes an entry-wise $l_1$ regularization on W. Under certain conditions, $l_1$ regularization can correctly uncover the underlying ground truth sparsity pattern. Since in many preference learning related applications (e.g. search engine), the model needs to be trained in a timely fashion and new (query, document) pairs may be added to the repository at any time, stochastic gradient descent in the online learning framework is used in one embodiment. To enforce the $l_1$ regularization, a mini-batch shrinking step is performed for every T iterations in the stochastic gradient descent which can lead to the sparse solution. Moreover, to reduce the additional bias introduced by the $l_1$ regularization, a refitting step is used to improve the preference prediction while keeping the learned sparsity pattern. Using sparsity, the model can be well controlled and efficiently learned. The result is a stochastic-gradient-descent-based sparse learning method that converges quickly with a small number of training samples. The method remains sparse and thus is memory consumption efficient in the whole training process. The method will make polynomial feature models (such as supervised semantic indexing) more effective in the following ways:

1. Consumes less memory.
2. Fast training process.
3. Able to handle more features.

In one embodiment, the system receives a set of documents in the corpus as $\{d^k\}_{k=1}^{K} \subset R^D$ and a query as $q \in R^D$, where D is the dictionary size, and the $j^{th}$ dimension of a document/query vector indicates the frequency of occurrence of the $j^{th}$ word, e.g. using the tf-idf weighting and then normalizing to unit length. Given a query q and a document d, the system learns a scoring function $f(q, d)$ that measures the relevance of d to q. In one embodiment, $f$ is a linear function which takes the form of Eq. (1). Each entry of W represents a "relationship" between a pair of words.

Given a set of tuples R (labeled data), where each tuple contains a query q, a preferred document $d^+$ and an unpreferred (or lower ranked) document $d^-$, the system learns a W such that $q^T W d^+ > q^T W d^-$, making the right preference prediction.

For that purpose, given tuple $(q, d^+, d^-)$, a margin rank loss technique can be used:

$$L_W(q, d^+, d^-) = h(q^T W d^+ - q^T W d^-) = \max(0, 1 - q^T W d^+ + q^T W d^-), \quad (2)$$

where $h(x) = \max(0, 1-x)$ is the hinge loss function as adopted in SVM.

The system learns the W matrix which minimizes the loss in Eq. (2) by summing over all tuples $(q, d^+, d^-)$ in R:

$$W^* = \operatorname*{argmin}_{W} \frac{1}{|R|} \sum_{(q,d^+,d^-) \in R} L_W(q, d^+, d^-). \quad (3)$$

In general, the size of R is large and new tuples may be added to R in a streaming manner, which makes it difficult to directly train the objective in Eq. (3). To address this issue, a stochastic (sub)gradient descent (SGD) is used in an online learning framework. At each iteration, the system randomly draws a sample $(q, d^+, d^-)$ from R, compute the subgradient of $L_W(q, d^+, d^-)$ with respect to W as following:

$$\nabla L_W(q, d^+, d^-) = \begin{cases} -q(d^+ - d^-)^T & \text{if } q^T W(d^+ - d^-) < 1 \\ 0 & \text{otherwise,} \end{cases} \quad (4)$$

and then update the W matrix accordingly.

$W^0$ is initialized to the identity matrix as this initializes the model to the same solution as a cosine similarity score. The strategy introduces a prior expressing that the weight matrix should be close to the identity matrix. Term correlations are used when it is necessary to increase the score of a relevant document, or conversely, decrease the score of a irrelevant document. As for the learning rate $\eta_t$, a decaying learning rate is used with $$\eta_t = \frac{C}{\sqrt{t}},$$

where C is a pre-defined constant as the initial learning rate. An exemplary pseudo code for the Stochastic Subgradient Descent (SGD) process is described below:

Initialization: $W^0 \in R^{D \times D}$, learning rate sequence $\{\eta_t\}$,
Iterate for t=1,2, . . . until convergence of $W^t$:
1. Randomly draw a tuple $(q,d^+,d^-) \in R$
2. Compute the subgradient of $L_{W^{t-1}}(q,d^+,d^-)$ with respect to $W: \nabla L_{W^{t-1}}(q,d^+,d^-)$
3. Update $W^t = W^{t-1} - \eta_t \nabla L_{W^{t-1}}(q,d^+,d^-)$ In one embodiment, an explicit form of the subgradient $\nabla L_W(q,d^+,d^-)$ takes the following form:

$$\nabla L_W(q, d^+, d^-) = \begin{cases} -q(d^+ - d^-)^T & \text{if } q^T W(d^+ - d^-) < 1 \\ 0 & \text{otherwise.} \end{cases} \quad (5)$$

As discussed in the introduction, the model and the learning algorithm in the previous section will lead to a dense W matrix which consumes a large amount of memory and has poor generalization ability for small corpora. To address these problems, a sparse model with a small number of nonzero entries of W is learned. In order to obtain a sparse W, an entry-wise $l_1$ norm is added to W as a regularization term to the loss function and optimized as the following objective function:

$$W^* = \arg\min_W \frac{1}{|R|} \sum_{(q,d^+,d^-) \in R} L_W(q, d^+, d^-) + \lambda \|W\|_1, \quad (6)$$

where $\|W\|_1 = \Sigma_{i,j=1}^D |W_{ij}|$ is the entry-wise $l_1$ norm of W and $\lambda$ is the regularization parameter which controls the sparsity level (the number of nonzero entries) of W. In general, a larger $\lambda$ leads to a more sparse W. On the other hand, too sparse a W will miss some useful relationship information among word pairs (considering diagonal W as an extreme case). Therefore, in practice, $\lambda$ is tuned to obtain a W with a suitable sparsity level.

Next, the training of the Sparse Model is discussed. To optimize Eq. (6), a variant of the general sparse online learning scheme is applied. After updating $W^t$ at each iteration in SGD, a shrinkage step is performed by solving the following optimization problem:

$$\hat{W}^t = \arg\min_W \frac{1}{2} \|W - W^t\|_F^2 + \lambda \eta_t \|W\|_1, \quad (7)$$

and then use $\hat{W}^t$ as the starting point for the next iteration. In Eq. 7, $\|\cdot\|_F$ denote the matrix Frobenius norm and $\eta_t$ is the decaying learning rate for the $t^{th}$ iteration. Performing (7) will shrink those $W_{ij}^t$ with with an absolute value less than $\lambda \eta_t$ to zero and hence lead to a sparse W matrix.

Although performing the shrinkage step leads a sparse W solution, it becomes expensive for a large dictionary size D. For example, when D=10,000, $D^2=10^8$ operations are needed. In one embodiment, shrinkage is performed for every T iteration cycles. In general, a smaller T guarantees that the shrinkage step can be done in a timely fashion so that the entries of W will not grow too large to produce inaccurate $\nabla L_W(q,d^+,d^-)$; on the other hand, a smaller T increases the computational cost of the training process. In one embodiment, T=100. When t is a multiple of T, the shrinkage step with a cumulative regularization parameter is used for solving the following optimization problem:

$$W^T = \arg\min_W \frac{1}{2} \|W - W_0\|_F^2 + \lambda \sum_{t=1}^T \eta_t \|W\|_1.$$

By taking the shrinkage step at every iteration, the learned sparse W is a good approximation. Pseudo-code for the Sparse SGD process is:

Sparse SGD

Initialization: $W^0 \in R^{D \times D}$, T, learning rate sequence $\{\eta_t\}$.
Iterate for t=1,2, . . . until convergence of $W^t$:
1. Randomly draw a tuple $(q,d^+,d^-) \in R$
2. Compute the subgradient of $L_{W^{t-1}}(q,d^+,d^-)$ with respect to $W: \nabla L_{W^{t-1}}(q,d^+,d^-)$
3. Update $W^t = W^{t-1} - \eta_t \nabla L_{W^{t-1}}(q,d^+,d^-)$
4. If (t mod T=0)

$$W^T = \arg\min_W \frac{1}{2} \|W - W_0\|_F^2 + \lambda \sum_{t=1}^T \eta_t \|W\|_1.$$

Next, refitting the Sparse Model is discussed. From Eq. (8), $l_1$ regularization will not only shrink the weights for uncorrelated word pairs to zero but also reduces the absolute value of the weights for correlated word pairs. This additional bias introduced by $l_1$ regularization often harm the prediction performance. In order to reduce this bias, the system refits the model without $l_1$ regularization, but enforcing the sparsity pattern of W by minimizing the following objective function:

$$W^* = \arg\min_W \frac{1}{|R|} \sum_{(q,d^+,d^-) \in R} L_{P_\Omega(W)}(q, d^+, d^-), \quad (9)$$

SGD is used to minimize Eq. (9), but $\nabla L_W(q,d^-,d^-)$ is replaced with $\nabla L_{P_\Omega(W)}(q,d^+,d^-)$. Using the chain rule for sub gradient, $\nabla L_{P_\Omega(W)}(q,d^+,d^-)$ takes the following form:

$$\nabla L_{P_\Omega(W)}(q, d^+, d^-) = \begin{cases} -P_\Omega(q(d^+ - d^-)^T) & \text{if } q^T P_\Omega(W)(d^+ - d^-) < 1 \\ 0 & \text{otherwise.} \end{cases}$$

In Eq. (6), the system enforces the sparsity and regularizes each $W_{ij}$ with the same regularization parameter $\lambda$ which does not incorporate the prior knowledge about the importance of the word pair (i, j) for the specific preference ordering. For example, the most frequent pairs of words, e.g. (a, the), (in, on), do not convey much information; so the regularization parameter for those pairs should be large to let $W_{ij}$ have more tendency to become zero. On the other hand, some less frequent pairs of words, e.g. (Israel, Jerusalem) are very essential for the preference ordering and the corresponding regularization parameters should be small. Therefore, instead of using the same λ to regularize all $|W_{ij}|$, the system assign different regularization parameters for each $|W_{ij}|$ and propose to learn the sparse W via the following objective function:

$$\frac{1}{|R|} \sum_{(q,d^+,d^-)\in R} L_W(q, d^+, d^-) + \lambda \sum_{i,j=1}^{D} \gamma_{ij}|W|_{ij}, \quad (10)$$

where the hyperparameter $\gamma_{ij}$ measures the importance of word pair (i, j) for the preference learning task and it should be large for those less important word pair. Based on the above discussion, in this paper, $\gamma_{ij}$ is set to be proportional to $f_i \cdot f_j$, where $f_i, f_j$ are the document frequencies for $i^{th}$ and $j^{th}$ words. We normalize $\gamma_{ij}$ such that $\max_{i,j}\gamma_{ij}=1$. Eq. (10) can be minimized as:

$$W^t = \operatorname*{argmin}_{W} \frac{1}{2} \|PW - W^t P\|_F^2 + \lambda \sum_{k=t-T+1}^{t} \eta_t \lambda \sum_{i,j=1}^{D} \gamma_{ij}|W|_{ij}.$$

The prediction performance gets improved after the refitting step. In contrast to the traditional preference learning or "learning to rank" with a few hundred hand-crafted features, the basic model directly performs learning on actual words and considers their pairwise relationships between query and document. Although the pairwise relationship of words could improve and provide additional semantic information, the basic model suffers from storage overloads and parameter overfitting. To overcome these drawbacks, sparsity is applied to the model which is achieved by the $l_1$ regularization with an efficient online learning algorithm. The method achieves good performance with fast convergence, while remaining sparse during training (small memory consumption), on a model with hundreds of millions of parameters. The inventors contemplate that extended models can learn group structure or even hierarchical structure of the words using group lasso type of regularization. The prior knowledge on the structure of W can also be imposed.

2) Sparse Latent Semantic Analysis

As discussed above, LSA is one of the most successful tools for learning the concepts or latent topics from text, has widely been used for the dimension reduction purpose in information retrieval. Given a document-term matrix $X \in R^{N \times M}$, where N is the number of documents and M is the number of words, and the number of latent topics (the dimensionality of the latent space) is set as D(D≤min{N, M}), LSA applies singular value decomposition (SVD) to construct a low rank (with rank-D) approximation of X:X≈$USV^T$, where the column orthogonal matrices $U \in R^{N \times D}$ ($U^T U=I$) and $V \in R^{M \times D}$ ($V^T V=I$) represent document and word embeddings into the latent space. S is a diagonal matrix with the D largest singular values of X on the diagonal. Subsequently, the so-called projection matrix defined as $A=S^1 V^T$ provides a transformation mapping of documents from the word space to the latent topic space, which is less noisy and considers word synonymy (i.e. different words describing the same idea). However, in LSA, each latent topic is represented by all word features which sometimes makes it difficult to precisely characterize the topic-word relationships.

Figure 2:
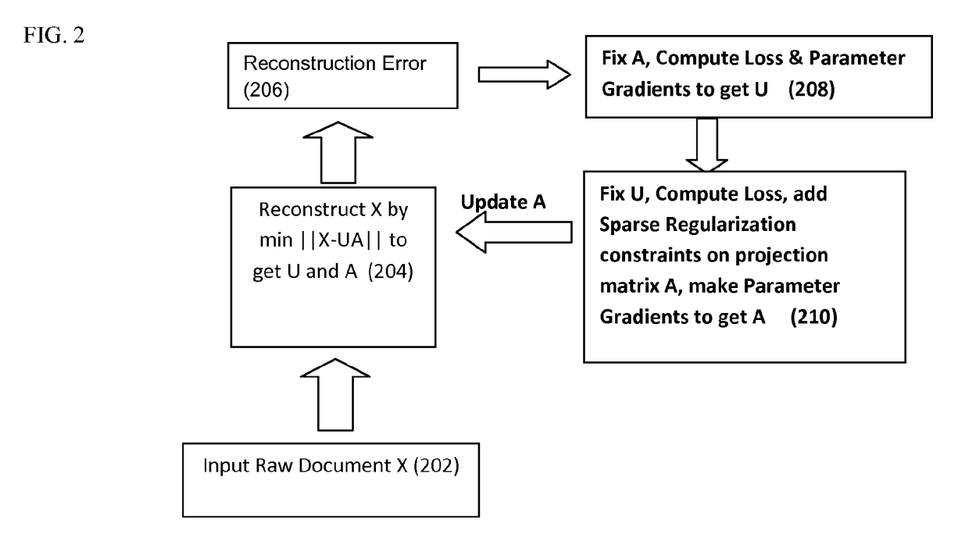
FIG. 2 shows an exemplary "sparse latent semantic analysis" learning method.

FIG. 2 shows an exemplary learning method named "sparse latent semantic analysis" (SLSA) that adds sparsity constraints on the projection matrix inside LSA. The Sparse LSA approach improves LSA as an optimization problem which minimizes the approximation error under the orthogonality constraint of U. Based on this formulation, the sparsity constraint of the projection matrix A is added via the $l_1$ regularization as in the lasso model. By enforcing the sparsity on A, the model has the ability to automatically select the most relevant words for each latent topic. SLSA provides a more compact representation of the topic-word relationship, and is memory consumption efficient in the whole training process.

Referring now to FIG. 2, raw documents are received as input (202). The process reconstructs X by min ||X–UA|| to get U and A (204). Reconstruction errors are determined (206). Next, the process, with a fixed projection matrix A, determines loss and parameter gradients to obtain U (208). Next, the process fixes U and determines loss and sparse regularization constraints on the projection matrix A. The process also generates the parameter coefficients to get the updated projection matrix A (210) and sends the updated matrix A to operation 204.

A notable advantage of sparse LSA is its good interpretability in topic-word relationship. Sparse LSA automatically selects the most relevant words for each latent topic and hence provides us a clear and compact representation of the topic-word relationship. Moreover, for a new document q, if the words in q has no intersection with the relevant words of d-th topic (nonzero entries in $A^d$, the d-th row of A), the d-th element of q̂, $A^d q$, will become zero. In other words, the sparse latent representation of q̂ clearly indicates the topics that q belongs to.

Another benefit of learning sparse A is to save computational cost and storage requirements when D is large. In traditional LSA, the topics with larger singular values will cover a broader range of concepts than the ones with smaller singular values. For example, the first few topics with largest singular values are often too general to have specific meanings As singular values decrease, the topics become more and more specific. Therefore, we might want to enlarge the number of latent topics D to have a reasonable coverage of the topics. However, given a large corpus with millions of documents, a larger D will greatly increase the computational cost of projection operations in traditional LSA. In contrary, for Sparse LSA, projecting documents via a highly sparse projection matrix will be computationally much more efficient; and it will take much less memory for storing A when D is large.

In order to obtain a sparse A, inspired by the lasso model, an entry-wise $l_1$-norm of A is added as the regularization term to the loss function and formulate the Sparse LSA model as:

$$\min_{U,A} \frac{1}{2}\|X - UA\|_F^2 + \lambda\|A\|_1 \quad (14)$$

subject-to: $U^T U = I$, where $\|A\|_1 = \sum_{d=1}^{D} \sum_{j=1}^{M} |a_{dj}|$ is the entry-wise $l_1$-norm of A and λ is the positive regularization parameter which controls the density (the number of nonzero entries) of A. In general, a larger λ leads to a sparser A. On the other hand, a too sparse A will miss some useful topic-word relationships which harms the reconstruction performance. Therefore, in practice, larger λ should be used to obtain a more sparse A while still achieving good reconstruction performance.

Although the optimization problem is non-convex, fixing one variable (either U or A), the objective function with respect to the other is convex. Therefore, one approach to solve Eq. (14) is by:

1. When U is fixed, let $A_j$ denote the j-th column of A; the optimization problem with respect to A:

$$\min_A \frac{1}{2}\|X - UA\| + \lambda\|A\|_1,$$

can be decomposed in to M independent ones:

$$\min_{A_j} \frac{1}{2}\|X_j - UA_j\|_2^2 + \lambda\|A_j\|_1; \ j=1, \ldots, M. \quad (15)$$

Each subproblem is a standard lasso problem where $X_j$ can be viewed as the response and U as the design matrix. To solve Eq. (15), a lasso solver can be applied, which is essentially a coordinate descent approach.

2. When A is fixed, the optimization problem is equivalent to:

$$\min_U \frac{1}{2}\|X - UA\|_F^2 \quad (16)$$
$$\text{subject to: } U^T U = I.$$

The objective function in Eq. (16) can be further written as:

$$\frac{1}{2}\|X - UA\|_F^2 = \frac{1}{2}tr((X - UA)^T(X - UA))$$
$$= -tr(A^T U^T X) + \frac{1}{2}tr(X^T X) + \frac{1}{2}tr(A^T U^T UA)$$
$$= -tr(A^T U^T X) + \frac{1}{2}tr(X^T X) + \frac{1}{2}tr(A^T A),$$

where the last equality is according to the constraint that $U^T U = I$. By the fact that $tr(A^T U^T X) = tr(U^T X A^T)$, the optimization problem in Eq. (16) is equivalent to $$\max_U tr(U^T X A^T) \quad (17)$$

Subject to $U^T U = I$.

Let $V = XA^T$. In fact, V is the latent topic representations of the documents X. Assuming that V is full column rank, i.e. with rank(V)=D, Eq. (17) has the closed form solution when the singular value decomposition (SVD) of V is V=PΔQ, the optimal solution to Eq. (17) is U=PQ.

As for the starting point, any $A^0$ or $U^0$ stratifying $(U^0)^T U^0 = I$ can be adopted. One embodiment uses a simple initialization strategy for $U^0$ as following:

$$U^0 = \begin{pmatrix} I_D \\ 0 \end{pmatrix}, \quad (18)$$

where $I_D$ the D by D identity matrix. It is easy to verify that $(U^0)^T U^0 = I$.

The optimization procedure can be summarized as pseudo code below:

Optimization Algorithm for Sparse LSA

Input: X, the dimensionality of the latent space D, regularization parameter λ
Initialization:

$$U^0 = \begin{pmatrix} I_D \\ 0 \end{pmatrix},$$

Iterate until convergence of U and A:
1. Compute A by solving M lasso problems as in Eq. (15)
2. Project X onto the latent space: $V = XA^T$.
3. Compute the SVD of V: V=PΔQ and let U=PQ.
Output: Sparse projection matrix A.

As for the stopping criteria, let $\|\cdot\|_{2\delta}$. denote the matrix entry-wise $l_\infty$-norm, for the two consecutive iterations t and t+1, the process computes the maximum change for all entries in U and A: $\|U_{(t+1)} - U^{(t)}\|_\infty$ and $\|A^{(t+1)} - A^{(t)}\|_\infty$; and stop the optimization procedure when both quantities are less than the prefixed constant τ. In one implementation, τ=0.01.

Next, two extensions of the Sparse LSA is discussed:
1. Group Structured Sparse LSA with group structured sparsity-inducing penalty added to select the most relevant groups of features relevant to the latent topic.
2. Non-negative Sparse LSA which enforces non-negativity constraint on the projection matrix A to provide a pseudo probability distribution of each word given the topic, similar as in Latent Dirichlet Allocation (LDA).

Group Structured Sparse LSA

Although entry-wise $l_1$-norm regularization leads to the sparse projection matrix A, it does not take advantage of any prior knowledge on the structure of the input features (e.g. words). When the features are naturally clustered into groups, it is more meaningful to enforce the sparsity pattern at a group level instead of each individual feature; so that we can learn which groups of features are relevant to a latent topic. It has many potential applications in analyzing biological data. For example, in the latent gene function identification, it is more meaningful to determine which pathways (groups of genes with similar function or near locations) are relevant to a latent gene function (topic).

Similar to the group lasso approach, the process can encode the group structure via a $l_1/l_2$ mixed norm regularization of A in Sparse LSA. Formally, we assume that the set of groups of input features $G=\{g_1, \ldots, g_{|G|}\}$ is defined as a subset of the power set of $\{1, \ldots M\}$, and is available as prior knowledge. For the purpose of simplicity, groups are non-overlapped. The group structured Sparse LSA can be formulated as:

$$\min_{U,A} \frac{1}{2}\|X - UA\|_F^2 + \lambda \sum_{d=1}^D \sum_{g \in G} w_g \|A_{dg}\|_2 \quad (19)$$

Subject to $U^T U = I,$ where $A_{dg} \in R^{|g|}$ is the subvector of A for the latent dimension d and the input features in group g; $w_g$ is the predefined regularization weight each group g, λ is the global regularization parameter; and $P \cdot P_2$ is the vector $l_2$-norm which enforces all the features in group g for the d-th latent topic, $A_{dg}$, to achieve zeros simultaneously. A simple strategy for setting $w_g$ is $w_g = \sqrt{|g|}$ as in [?] so that the amount of penalization is adjusted by the size of each group.

To solve Eq. (19), when U is fixed, the optimization problem becomes:

$$\min_A f(A) \equiv \frac{1}{2}\|X - UA\|_F^2 + \lambda \sum_{d=1}^{D} \sum_{g \in G} w_g \|A_{dg}\|_2. \quad (20)$$

To solve Eq. (20), an efficient block coordinate descent technique is used: at each iteration, the objective function is minimized with respect to $A_{dg}$ while the other entries in A are held fixed.

More precisely, assume that now fix a particular latent dimension d and a group g; the process optimizes $f(A)$ with respect to $A_{dg}$. Denote the i-th row of U as $U^1$ and the first part of $f(A)$ as $$g(A) \equiv \frac{1}{2}\|X - UA\|_F^2,$$

the gradient of $g(A)$ over $A_{dg}$ is a $|g|$ dimensional vector where the j∈g-th element takes the following form:

$$\left(\frac{\partial g(A)}{\partial A_{dg}}\right)_{j \in g} = \sum_{i=1}^{N} u_{id}\left((U^i)^T A_j - x_{ij}\right).$$

To convert $$\frac{\partial g(A)}{\partial A_{dg}}$$

in the vector form, $C_d = \sum_{i=1}^{N} u_{id}^2$ and $B_{dg}$ be the vector of length $|g|$ such that:

$$(B_{dg})_{j \in g} = \sum_{i=1}^{N} u_{id}\left(x_{ij} - \sum_{k \neq d} u_{ik} a_{kj}\right). \quad (11)$$

The vector form of $$\frac{\partial g(A)}{\partial A_{dg}}$$

can be written as:

$$\frac{\partial g(A)}{\partial A_{dg}} = C_d A_{dg} - B_{dg}.$$

The minimization of $f(A)$ with respect to $A_{dg}$ has a closed-form solution. Take the subgradient of $f(A)$ over $A_{dg}$:

$$\frac{\partial f(A)}{\partial A_{dg}} = \frac{\partial g(A)}{\partial A_{dg}} + \frac{\partial \|A_{dg}\|_2}{\partial A_{dg}} \quad (12)$$

$$= C_d A_{dg} - B_{dg} + \lambda w_g \frac{\partial \|A_{dg}\|_2}{\partial A_{dg}},$$

where $$\frac{\partial PA_{dg}P_2}{\partial A_{dg}} = \begin{cases} \frac{A_{dg}}{\|A_{dg}\|_2} & A_{dg} \neq 0 \\ \{\alpha \in R^{|g|}|\|\alpha\|_2 \leq 1\} & A_{dg} = 0 \end{cases} \quad (13)$$

The closed-form solution of $A^*_{dg}$ can be given in the following proposition.

The optimal $A^*_{dg}$ for the minimization of $f(A)$ with respect to $A_{dg}$ takes the following form:

$$A^*_{dg} = \begin{cases} \frac{B_{dg}\|B_{dg}\|_2 - \lambda w_g}{C_d \|B_{dg}\|_2} & \|B_{dg}\|_2 > \lambda w_g \\ 0 & \|B_{dg}\|_2 \leq \lambda w_g. \end{cases} \quad (14)$$

The block coordinate descent for optimizing A is summarized in the following pseudo-code ---
Algorithm 2 Optimization for A with group structure ---
Input: X, U, the dimensionality of the latent space D,
the global regularization parameter λ, group structure
G, regularization weights of groups $\{w_g\}_{g \in G}$.
    while A has not converged do
      for d = 1, 2, . . . , D do
        Compute $C_d = \sum_{i-1}^{N} u_{id}^2$
        for all g ∈ G do
          Compute $B_{dg}$ according to Eq. (3.11)
          if $\|B_{dg}\|_2 > \lambda w_g$ then
$$A_{dg} \leftarrow \frac{B_{dg}(\|B_{dg}\|_2 - \lambda w_g)}{C_d \|B_{dg}\|_2}$$
          else
            $A_{dg} \leftarrow 0$
          end if
        end for
      end for
    end while
Output: Sparse projection matrix A.

---

Non-negative Sparse LSA

It is natural to assume that each word has a non-negative contribution to a specific topic, i.e. the projection matrix A should be non-negative. In such a case, the system can normalize each row of A to 1:

$$\hat{a}_{dj} = \frac{a_{dj}}{\sum_{j=1}^{M} a_{dj}}.$$

Since $a_{dj}$ measures the relevance of the j-th word, $w_j$, to the d-th topic $t_d$, from the probability perspective, $\hat{a}_{dj}$ can be viewed as a pseudo probability of the word $w_j$ given the topic $t_d$, $P(w_j|t_d)$. Similar to topic modeling in the Bayesian framework such as LDA, the non-negative Sparse LSA can also provide the most relevant/likely words to a specific topic.

More formally, the non-negative Sparse LSA can be formulated as the following optimization problem:

$$\min_{U,A} \frac{1}{2}\|X - UA\|_F^2 + \lambda\|A\|_1 \quad (15)$$

Subject to $U^T U = I, A \geq 0$.

According to the non-negativity constraint of A, $|a_{dj}|=a_{dj}$ and Eq. (15) is equivalent to:

$$\min_{U,A} \frac{1}{2}\|X - UA\|_F^2 + \lambda\sum_{d=1}^{D}\sum_{j=1}^{J} a_{dj} \quad (16)$$

Subject to $U^T U = I$, $A \geq 0$.

When A is fixed, the optimization with respect to U is the same as that in Eq. (16). When U is fixed, the optimization over A can be decomposed in to M independent subproblems, each one corresponds to a column of A:

$$\min_{A_j \geq 0} f(A_j) = \frac{1}{2}\|X_j - UA_j\| + \lambda\sum_{d=1}^{D} a_{dj}. \quad (17)$$

The coordinate descent method is used to minimize $f(A_j)$: fix a dimension of the latent space d; optimize $f(A_j)$ with respect to $a_{dj}$ while keeping other entries in $f(A_j)$ fixed and iterate over d. More precisely, for a fixed d, the gradient of $f(A_j)$ with respect to $a_{dj}$:

$$\frac{\partial f(A_j)}{\partial a_{dj}} = c_d a_{dj} - b_d + \lambda, \quad (18)$$

where $$c_d = \sum_{i=1}^{N} u_{id}^2,$$

$$b_d = \sum_{i=1}^{N} u_{id}\left(x_{ij} - \sum_{k \neq d} u_{ik} a_{kj}\right).$$

When $b_d > \lambda$, setting $$a_{dj} = \frac{b_d - \lambda}{c_d}$$

will make $$\frac{\partial f(A_j)}{\partial a_{dj}} = 0.$$

If $$b_d \leq \lambda, \frac{\partial f(A_j)}{\partial a_{dj}} \geq 0$$

for all $a_{dj} \geq 0$, $f(A_j)$ is a monotonic increasing function with $a_{dj}$ and the minimal is achieved when $a_{dj}=0$.

In sum, the optimal $a^*_{dj}$ for the minimization $f(A_j)$ with respect to $a_{dj}$ takes the following form:

$$a_{dj}^* = \begin{cases} \frac{b_d - \lambda}{c_d} & b_d > \lambda \\ 0 & b_d \leq \lambda. \end{cases} \quad (19)$$

Compared to the traditional LSA, Sparse LSA selects only a small number of relevant words for each topic and hence provides a compact representation of topic-word relationships. Moreover, Sparse LSA is computationally very efficient with significantly reduced memory usage for storing the projection matrix. Empirical results show that Sparse LSA achieves similar performance gains to LSA, but is more efficient in projection computation, storage, and also well explain the topic-word relationships. For example, the LSA is more effective in the following ways:

1. Provide a clear and compact representation of the topic-word relationship, which makes the model easy to explain
2. Consumes less memory.
3. Able to handle more topics.

The Sparse LSA model is intuitive that only a part of the vocabulary can be relevant to a certain topic. By enforcing sparsity of A such that each row (representing a latent topic) only has a small number nonzero entries (representing the most relevant words), Sparse LSA can provide a compact representation for topic-word relationship that is easier to interpret. Further, with the adjustment of sparsity level in projection matrix, the system could control the granularity ("level-of-details") of the topics it is trying to discover, e.g. more generic topics have more nonzero entries in rows of A than specific topics. Due to the sparsity of A, Sparse LSA provides an efficient strategy both in the time cost of the projection operation and in the storage cost of the projection matrix when the dimensionality of latent space D is large. The Sparse LSA could project a document q into a sparse vector representation $\hat{q}$ where each entry of $\hat{q}$ corresponds to a latent topic. In other words, we could know the topics that q belongs to directly form the position of nonzero entries of $\hat{q}$. Moreover, sparse representation of projected documents will save a lot of computational cost for the subsequent retrieval tasks, e.g. ranking (considering computing cosine similarity), text categorization, among others.

The Sparse LSA provides a more compact and precise projection by selecting only a small number of relevant words for each latent topic. Extensions of Sparse LSA, group structured LSA and non-negative Sparse LSA, along with a simple yet efficient system to learn the sparse projection matrix for these models, are presented. The inventors contemplate utilizing the online learning scheme to learn web-scale datasets.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 3:
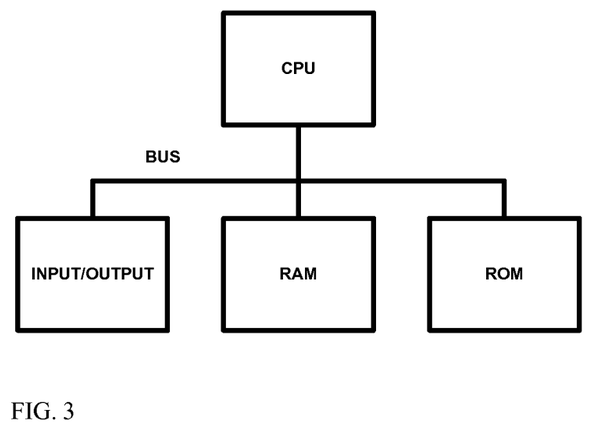
FIG. 3 shows an exemplary computer that can analyze documents.

By way of example, a block diagram of a computer to support the system is discussed next in FIG. 3. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself

What is claimed is:

1. A method to perform preference learning on a set of documents, the method comprising:
receiving raw input features from the set of documents stored on a data storage device;
generating polynomial combinations from the raw input features;
generating one or more parameters W;
applying W to one or more classifiers to generate outputs;
determining a loss function and parameter gradients and updating W;
determining one or more sparse regularizing terms and updating W;
expressing that one document is preferred over another in a search query and retrieving one or more documents responsive to the search query; and
summing over all tuples $(q,d^+,d^-)$ in R:

$$W^* = \underset{W}{\operatorname{argmin}} \frac{1}{|R|} \sum_{(q,d^+,d^-) \in R} L_W(q, d^+, d^-),$$

where R is a set of tuples,
q is a query,
$d^+$ is a preferred document,
$d^-$ is an unprefereed document, and
$L_w$ is a loss for W.

2. The method of claim 1, comprising constraining W to be a plurality of sparse matrix zero entries for pairs of words irrelevant to the preference learning.

3. The method of claim 2, comprising imposing an entry-wise $l_1$ regularization on W.

4. The method of claim 1, comprising enforcing an $l_1$ regularization with mini-batch shrinking for every predetermined iterations in a stochastic gradient descent.

5. The method of claim 1, comprising refitting the parameters to improve a preference prediction while keeping a learned sparsity pattern.

6. The method of claim 1, comprising performing a stochastic (sub)gradient descent (SGD) with an online learning framework.

7. The method of claim 1, comprising applying a learning rate $\eta_t$ for a $t^{th}$ iteration, a decaying learning rate is used with $\eta_t = C/\sqrt{t}$, where C is a pre-defined constant as an initial learning rate and t is an iteration count.

8. The method of claim 1, comprising performing Stochastic Subgradient Descent (SGD) by:
randomly selecting a tuple $(q,d+,d^-)^{\in R}$;
determining a subgradient of $L_{W^{t-1}}(q,d^+,d^-)$ with respect to W: $\nabla L_{W^{t-1}}(q,d^{30},d^-)$; and
updating $W^t = W^{t-1} - \eta_t \nabla L_{W^{t-1}}(q,d^{+,d-})$
where $$\nabla L_W(q, d^+, d^-) = \begin{cases} -q(d^+ - d^-)^T & \text{if } q^T W(d^+ - d^-) < 1 \\ 0 & \text{otherwise.} \end{cases}$$

R is a set of tuples,
q is a query,
$d^+$ is a preferred document,
$d^-$ is an unprefereed document,
$L_w$ is a loss for W,
t is an iteration count, and
$\eta_t$ is a learning rate for a $t^{th}$ iteration.

9. The method of claim 1, comprising adding an entry-wise $l_1$ norm to W as a regularization term to the loss function and optimized as the following objective function:

$$W^* = \underset{W}{\operatorname{argmin}} \frac{1}{|R|} \sum_{(q,d^+,d^-) \in R} L_W(q, d^+, d^-) + \lambda \|W\|_1,$$

where $\|W\|_1 = \Sigma_{i,j=1}^D |W_{ij}|$ is an entry-wise $l_1$ norm of W and $\lambda$ is a regularization parameter which controls a sparsity level (number of nonzero entries) of W,
R is a set of tuples,
q is a query,
$d^+$ is a preferred document,
$d^-$ is an unprefereed document,
$L_w$ is a loss for W, and
D is a directory size.

10. The method of claim 1, comprising:
solving the following optimization problem:

$$\hat{W}^t = \underset{W}{\operatorname{argmin}} \frac{1}{2} \|W - W^t\|_F^2 + \lambda \eta_t \|W\|_1,$$

using $\hat{W}^t$ as a starting point for the next iteration,
where $\|W\|_1 = \Sigma_{i,j=1}^D |W_{ij}|$ is an entry-wise $l_1$ norm of W and $\lambda$ is a regularization parameter which controls a sparsity level (number of nonzero entries) of W,
$\|\ \|_F$ is a matrix Frobenius norm,
t is an iteration count, and
$\eta_t$ is a learning rate for a $t^{th}$ iteration.

11. The method of claim 1, comprising shrinking $W_{ij}^t$ with an absolute value less than $\lambda \eta_t$ to zero and generating a sparse W matrix, where
$\lambda$ is a regularization parameter which controls a sparsity level (number of nonzero entries) of W,
t is an iteration count, and
$\eta_t$ is a learning rate for a $t^{th}$ iteration.

12. The method of claim 1, comprising shrinking W wherein a cumulative regularization parameter is used for solving:

$$W^T = \underset{W}{\mathrm{argmin}} \frac{1}{2} \|W - W_0\|_F^2 + \lambda \sum_{t=1}^{T} \eta_t \|W\|_1,$$

where $\|W\|_1 = \Sigma_{i,j=1}^{D} |W_{ij}|$ is an entry-wise $l_1$ norm of W and
$\lambda$ is a regularization parameter which controls a sparsity level (number of nonzero entries) of W,
$\| \|_F$ is a matrix Frobenius norm,
t is an iteration count,
T is the number of iteration cycles, and
$\eta_t$ is a learning rate for a $t^{th}$ iteration.

13. The method of claim 1, comprising performing shrinkage at every iteration to generate a sparse W.

14. The method of claim 1, comprising:
initializing with $W^0 \in R^{D \times D}$, T, learning rate sequence $\{\eta_t\}$;
randomly draw a tuple $(q,d^+,d^-) \in R$;
determining a subgradient of $L_{W^{t-1}}(q,d^+,d^-)$ with respect to W: $\nabla L_{W^{t-1}}(q,d^+,d^-)$;
updating $W^t = W^{t-1} - \eta_t \nabla L_{W^{t-1}}(q,d^+,d^-)$; and
if (t mod T=0) determining $$W^T = \underset{W}{\mathrm{argmin}} \frac{1}{2} \|W - W_0\|_F^2 + \lambda \sum_{t=1}^{T} \eta_t \|W\|_1,$$

where $\|W\|_1 = \Sigma_{i,j=1}^{D} |W_{ij}|$ is an entry-wise $l_1$ norm of W and
$\lambda$ is a regularization parameter which controls a sparsity level (number of nonzero entries) of W,
$\| \|_F$ is a matrix Frobenius norm,
R is a set of tuples,
q is a query,
$d^+$ is a preferred document,
$d^-$ is an unprefereed document,
$L_w$ is a loss for W, and
D is a directory size,
t is an iteration count,
T is the number of iteration cycles, and
$\eta_t$ is a learning rate for a $t^{th}$ iteration.

15. A computer to perform preference learning on a set of documents, the computer comprising:
means for receiving raw input features from the set of documents stored on a data storage device;
means for generating polynomial combinations from the raw input features;
means for generating one or more parameters W;
means for applying W to one or more classifiers to generate outputs;
means for determining a loss function and parameter gradients and updating W;
means for determining one or more sparse regularizing terms and updating W;
means for expressing that one document is preferred over another in a search query and retrieving one or more documents responsive to the search query; and
means for summing over all tuples $(q,d^+,d^-)$ in R:

$$W^* = \underset{W}{\mathrm{argmin}} \frac{1}{|R|} \sum_{(q,d^+,d^-) \in R} L_W(q, d^+, d^-),$$

where R is a set of tuples,
q is a query,
$d^+$ is a preferred document,
$d^-$ is an unprefereed document, and
$L_w$ is a loss for W.

16. The computer of claim 15, comprising means for constraining W to be a plurality of sparse matrix zero entries for pairs of words irrelevant to the preference learning.

17. The computer of claim 16, comprising means for imposing an entry-wise $l_1$ regularization on W.

18. The computer of claim 15, comprising means for enforcing an $l_1$ regularization with mini-batch shrinking for every predetermined iterations in a stochastic gradient descent.

19. The computer of claim 15, comprising means for refitting the parameters to improve a preference prediction while keeping a learned sparsity pattern.

* * * * *